US011978954B2

(12) United States Patent
Navarro

(10) Patent No.: US 11,978,954 B2
(45) Date of Patent: May 7, 2024

(54) COMPACT LOW-PROFILE APERTURE ANTENNA WITH INTEGRATED DIPLEXER

(71) Applicant: The Boeing Company, Chicago, IL (US)

(72) Inventor: Julio A. Navarro, Kent, WA (US)

(73) Assignee: The Boeing Company, Arlington, VA (US)

( * ) Notice: Subject to any disclaimer, the term of this patent is extended or adjusted under 35 U.S.C. 154(b) by 62 days.

(21) Appl. No.: 17/721,410

(22) Filed: Apr. 15, 2022

(65) Prior Publication Data

US 2022/0393359 A1 Dec. 8, 2022

Related U.S. Application Data

(60) Provisional application No. 63/195,987, filed on Jun. 2, 2021.

(51) Int. Cl.
*H01Q 13/06* (2006.01)
*H01P 3/12* (2006.01)
(Continued)

(52) U.S. Cl.
CPC ............ *H01Q 13/06* (2013.01); *H01P 5/107* (2013.01); *H01Q 5/55* (2015.01);
(Continued)

(58) Field of Classification Search
USPC .......................................................... 343/702
See application file for complete search history.

(56) References Cited

U.S. PATENT DOCUMENTS 4,562,416 A 12/1985 Sedivec
5,559,480 A 9/1996 Ivanisky
(Continued)

FOREIGN PATENT DOCUMENTS

JP 4256201 A 9/1992
JP H04256201 * 9/1992

OTHER PUBLICATIONS

Nair et al., "A 10 MHz to 100 GHz LTCC CPW-to-Stripline Vertical Transition", 2013 IEEE MTT-S International Microwave Symposium Digest, Jun. 2-7, 2013, pp. 1-4.
(Continued)

*Primary Examiner* — Dimary S Lopez Cruz
*Assistant Examiner* — Brandon Sean Woods
(74) *Attorney, Agent, or Firm* — Ostrager Chong Flaherty & Broitman P.C.

(57) ABSTRACT

An efficient, low-profile, lightweight fixed-beam (constant angle of departure) aperture antenna. The aperture antenna includes an array of horn radiators coupled to a waveguide diplexer by means of a stripline distribution network. The stripline distribution network is embedded in a printed wiring board (PWB), which PWB is sandwiched between a radiator plate (incorporating the horn radiators) and a diplexer plate. The aperture antenna may further include a backside ground plane made of metal. The diplexer plate and backside cover plate are configured to form the waveguide diplexer. Each horn radiator has a respective circular opening at one end adjacent to the PWB. The diplexer plate includes an array of circular waveguide backshorts which are congruent and respectively aligned with the circular openings of the horn radiators. The radiator plate further includes a rectangular waveguide backshort which is congruent and aligned with a rectangular port of the diplexer plate.

20 Claims, 6 Drawing Sheets

(51) Int. Cl.

| | |
|---|---|
| ***H01P 5/107*** | (2006.01) |
| ***H01P 5/20*** | (2006.01) |
| ***H01Q 1/50*** | (2006.01) |
| ***H01Q 5/55*** | (2015.01) |
| ***H01Q 13/02*** | (2006.01) |
| ***H01Q 21/00*** | (2006.01) |
| ***H01Q 21/06*** | (2006.01) |

(52) U.S. Cl.

CPC ........... *H01Q 13/0233* (2013.01); *H01P 3/12* (2013.01); *H01P 5/20* (2013.01); *H01Q 1/50* (2013.01); *H01Q 13/02* (2013.01); *H01Q 21/00* (2013.01); *H01Q 21/0075* (2013.01); *H01Q 21/0093* (2013.01); *H01Q 21/064* (2013.01)

(56) References Cited

U.S. PATENT DOCUMENTS

| | | | |
|---|---|---|---|
| 5,724,049 | A | 3/1998 | Park et al. |
| 5,912,598 | A | 6/1999 | Stones et al. |
| 6,081,241 | A | 6/2000 | Josefsson et al. |
| 6,486,748 | B1 | 11/2002 | Stones et al. |
| 6,549,106 | B2 | 4/2003 | Martin |
| 6,958,662 | B1 | 10/2005 | Salmela et al. |
| 6,967,542 | B2 | 11/2005 | Weinstein |
| 7,057,572 | B2 | 6/2006 | Lee et al. |
| 7,187,342 | B2 | 3/2007 | Heisen et al. |
| 7,948,443 | B2 | 5/2011 | Bullock et al. |
| 7,978,022 | B2 | 7/2011 | Seong et al. |
| 10,211,543 | B2 * | 2/2019 | Oppenlaender ........ H01Q 15/24 |
| 10,665,931 | B2 | 5/2020 | Lier et al. |
| 10,897,090 | B2 | 1/2021 | Navarro et al. |
| 2003/0184487 | A1 | 10/2003 | Desargent et al. |
| 2007/0139135 | A1 * | 6/2007 | Ammar ................. H01P 1/2138 333/135 |
| 2009/0284429 | A1 | 11/2009 | Lier et al. |
| 2011/0037530 | A1 | 2/2011 | Mangalahgari et al. |
| 2015/0162668 | A1 | 6/2015 | Oppenlaender et al. |
| 2018/0123254 | A1 | 5/2018 | Wu et al. |
| 2019/0067822 | A1 | 2/2019 | Bongard et al. |
| 2021/0036394 | A1 | 2/2021 | Trummer |

OTHER PUBLICATIONS

Machac et al., "On the design of waveguide-to-microstrip and waveguide-to-coplanar line transitions", 23rd European Microwave Conference, Oct. 1993.

Extended European Search Report (EESR) dated Oct. 27, 2022 in European Patent Application No. 22176240.4 (European counterpart to the instant U.S. patent application).

* cited by examiner

COMPACT LOW-PROFILE APERTURE ANTENNA WITH INTEGRATED DIPLEXER

RELATED PATENT APPLICATION

This application claims the benefit, under Title 35, United States Code, Section 119(e), of U.S. Provisional Application No. 63/195,987 filed on Jun. 2, 2021.

BACKGROUND

The technology disclosed herein generally relates to antenna systems and, in particular, relates to aperture antenna design.

An essential component of any wireless communications system is the antenna that transmits and/or receives the electromagnetic signals. There are generally two types of aperture antennas. The first type of aperture antenna is a horn antenna that typically includes a cluster or array of electromagnetic horn radiators (hereinafter "horn radiators") for directly transmitting and/or receiving radio frequency (RF) signals. The second type of aperture antenna is a reflector antenna, which generally includes a parabolic reflector complemented by one or more feed horns for transmitting and/or receiving RF signals.

One antenna structure often employed in communications satellites includes an array of horn radiators which are respectively electromagnetically coupled (hereinafter "coupled") to an array of microstrip patch elements or stripline diplexer feed probes. As used herein, the term "stripline" refers to an electrically conductive transmission line used to convey high-frequency radio signals, which transmission line is embedded in a dielectric (insulator) substrate that is sandwiched between two ground planes. Some antennas further include diplexers, which may also be implemented using waveguides.

Many antenna designs utilize separate structural members to support the antenna. Such antenna designs also use individually fabricated feed horns or antenna elements which are assembled to form an array. This adds extra weight, volume, and fabrication cost. Weight and volume are particularly significant constraints in the design of antenna on spacecraft. For example, lower mass and lower volume antennas can allow the spacecraft to launch on smaller, less costly launch vehicles. In addition, the installation of individual horns or antenna elements adds complexity to the dimensional stack up and flow time assembly.

Typical commercial off-the-shelf (COTS) solutions use antenna arrays, filters, diplexers, and electronics as separate parts requiring connectors and adapters. One positive aspect of this type of approach is that individual parts can be replaced. However, the penalty of such architecture is that the completed assembly tends to be large, heavy, and bulky. There is a need for antenna systems that are structurally efficient and have reduced mass and/or volume.

SUMMARY

The subject matter disclosed in detail below is directed to an efficient, low-profile, lightweight fixed-beam (constant angle of departure) aperture antenna. In accordance with one embodiment, the aperture antenna includes an array of horn radiators coupled to a waveguide diplexer by means of a stripline distribution network. The stripline distribution network is embedded in a printed wiring board (PWB), which PWB is sandwiched between a radiator plate (incorporating the horn radiators) and a diplexer plate. The aperture antenna may further include a backside ground plane made of metal, which is attached to the bottom of the diplexer plate. The diplexer plate and backside cover plate are configured to form the waveguide diplexer. The result is an efficient high-gain antenna in a compact, low-profile, lightweight package.

In accordance with one embodiment, the waveguide diplexer includes a T-junction, transmit and receive filters, and respective bends (e.g., E-plane bends and/or H-plane bends). The bends align with respective openings in the backside ground plane. Optionally, transmit and receive electronics (e.g., high-power amplifier (HPA), low-noise amplifier (LNA), limiter, etc.) may be attached to the backside ground plane. Additional circuitry can be included to provide more transmit-to-receive isolation, adaptive frequency nulling, and built-in-testing.

Although various embodiments of aperture antennas having an integrated waveguide diplexer will be described in some detail below, one or more of those embodiments may be characterized by one or more of the following aspects.

One aspect of the subject matter disclosed in some detail below is an aperture antenna comprising a diplexer plate, a printed wiring board attached to the diplexer plate and comprising a stripline distribution network, a radiator plate attached to the printed wiring board, and a backside cover plate attached to the diplexer plate. The stripline distribution network comprises a diplexer feed probe and an array of horn feed probes. The radiator plate comprises an array of horn radiators which are respectively configured to couple to the array of horn feed probes during antenna operation. The diplexer plate and backside cover plate are configured to form a waveguide diplexer that is coupled to the diplexer feed probe during antenna operation. The radiator plate further comprises a rectangular waveguide backshort which is congruent and aligned with a rectangular port of the waveguide diplexer. The diplexer feed probe is disposed between the rectangular port and the rectangular waveguide backshort. The diplexer plate further includes an array of circular waveguide backshorts which are respectively congruent and aligned with circular openings of the horn radiators. The feed horn probes are disposed between the circular waveguide backshorts of the diplexer plate and the circular openings of the horn radiators.

Another aspect of the subject matter disclosed in some detail below is an aperture antenna comprising a diplexer plate, a printed wiring board attached to the diplexer plate and comprising a stripline distribution network, and a radiator plate attached to the printed wiring board. The radiator plate comprises an array of horn radiators disposed adjacent to one side of the printed wiring board, each horn radiator having a respective circular opening at one end. The diplexer plate comprises an array of circular waveguide backshorts disposed on another side of the printed wiring board. The circular openings of the radiator plate and the circular waveguide backshorts of the diplexer plate are congruent and respectively aligned. The stripline distribution network comprises an array of horn feed probes respectively disposed between the array of circular openings of the radiator plate and the array of circular waveguide backshorts of the diplexer plate.

A further aspect of the subject matter disclosed below is an aperture antenna comprising: a printed wiring board comprising a stripline distribution network, wherein the stripline distribution network comprises a diplexer feed probe and an array of horn feed probes; a radiator plate disposed adjacent to one side of the printed wiring board, wherein the radiator plate comprises an array of horn radiators, wherein each horn radiator has a respective circular opening at one end; a diplexer plate disposed adjacent to one side of the printed wiring board, wherein the diplexer plate comprises an array of circular waveguide backshorts which are respectively aligned with the circular openings of the radiator plate, and wherein the array of horn feed probes are respectively disposed between the array of circular waveguide backshorts of the diplexer plate and the circular openings of the radiator plate; and a backside cover plate disposed adjacent to the diplexer plate, wherein the diplexer plate and backside cover plate are configured to form a waveguide diplexer having a first port formed in the diplexer plate and having second and thirds ports formed in the backside cover plate.

Other aspects of aperture antennas having an integrated waveguide diplexer are disclosed below.

BRIEF DESCRIPTION OF THE DRAWINGS

The features, functions and advantages discussed in the preceding section may be achieved independently in various embodiments or may be combined in yet other embodiments. Various embodiments will be hereinafter described with reference to drawings for the purpose of illustrating the above-described and other aspects. None of the diagrams are drawn to scale.

DETAILED DESCRIPTION

Illustrative embodiments of aperture antennas having an integrated waveguide diplexer are described in some detail below. However, not all features of an actual implementation are described in this specification. A person skilled in the art will appreciate that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Figure 1:
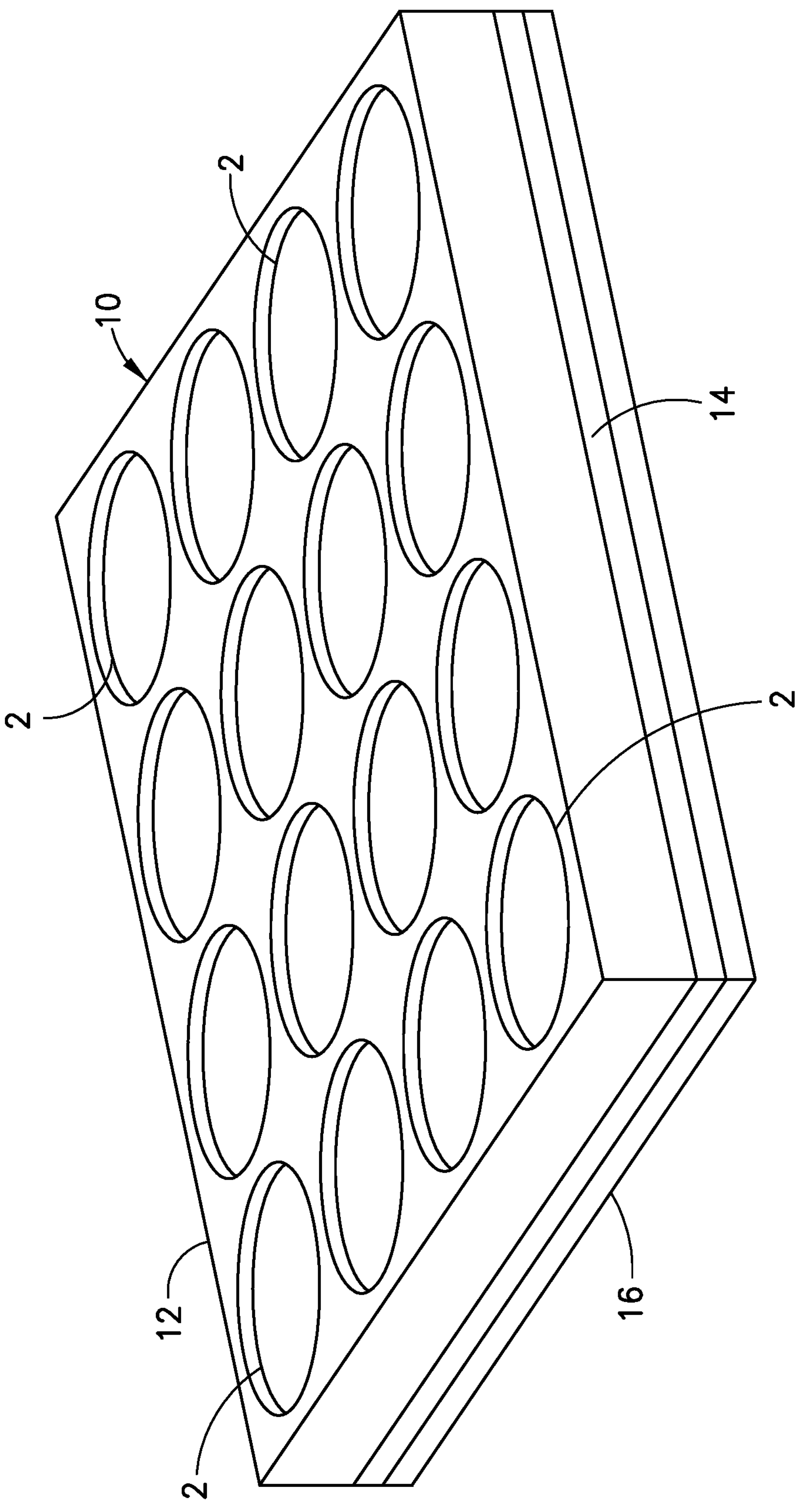
FIG. 1 is a diagram representing a three-dimensional (3-D) view of a low-profile aperture antenna including an array of horn radiators coupled to an integrated waveguide diplexer formed by a diplexer plate and a backside cover plate.

FIG. 1 is a diagram representing a three-dimensional (3-D) view of a low-profile aperture antenna 10 comprising a stack of machined metal plates, including a radiator plate 12, a diplexer plate 14, and a backside cover plate 16. As seen in FIG. 1, the diplexer plate 14 is disposed between radiator plate 12 and backside cover plate 16. The aperture antenna 10 further includes a printed wiring board (not shown), which is disposed between radiator plate 12 and diplexer plate 14.

The radiator plate 12 has been machined to form an array of horn radiators 2. When in service, the open mouths of horn radiators 2 may be covered by plastic sheets transparent to radio frequency waves to exclude moisture (plastic covers not shown in FIG. 1). Although not visible in FIG. 1, the aperture antenna 10 incorporates an integrated waveguide diplexer formed by diplexer plate 14 and backside cover plate 16, as will be described below with reference to FIG. 2.

In the example depicted in FIG. 1, aperture antenna 10 includes a 4×4 array of horn radiators 2 for the purpose of illustration. The innovative technology proposed herein may, however, be incorporated in aperture antennas have any number of horn radiators. Thus, it may be appreciated that the appended claims should not be construed to require a particular number of horn radiators.

Figure 2:
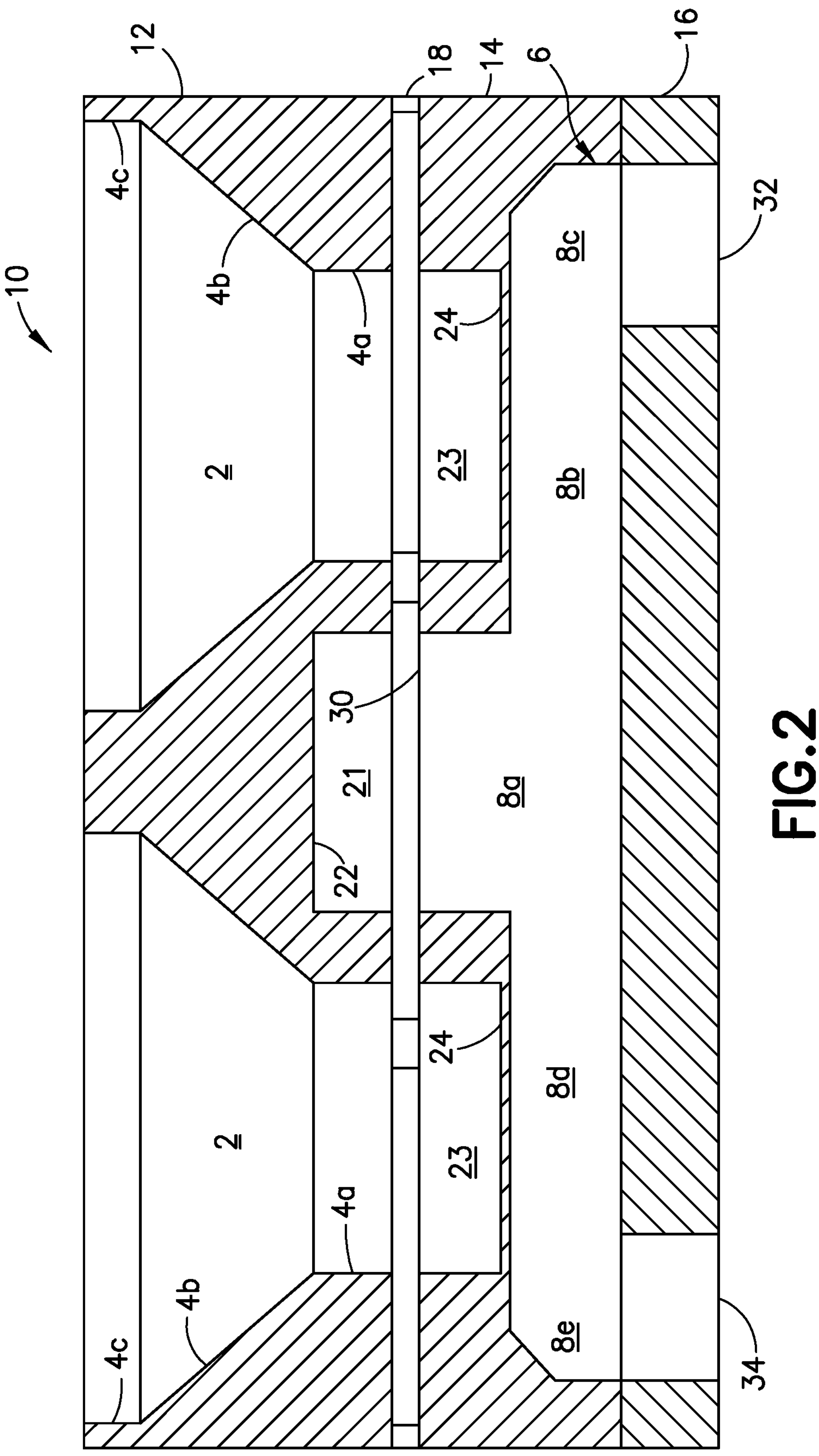
FIG. 2 is a diagram representing a cross-sectional view of a low-profile aperture antenna including a radiator plate, a printed wiring board (PWB), a diplexer plate, and a backside cover plate in accordance with one embodiment.

FIG. 2 is a diagram representing a cross-sectional view of a low-profile aperture antenna 10 including a diplexer plate 14, a printed wiring board 18 (hereinafter "PWB 18") attached to the diplexer plate 14, a radiator plate 12 attached to the PWB 18, and a backside cover plate 16 attached to the diplexer plate 14. The layers of PWB 18 are not shown in FIG. 2, but will be described below with reference to FIG. 4. In particular, the PWB 18 includes a stripline distribution network not shown in FIG. 2 (but see stripline distribution network 20 depicted in FIG. 3).

Referring again to FIG. 2, the PWB 18 is sandwiched between radiator plate 12 and diplexer plate 14. The radiator plate 12 comprises an array of horn radiators 2 disposed on one side of PWB 18. Each horn radiator 2 may be a respective axisymmetric surface machined into the radiator plate 12. The axisymmetric surface forms a cavity which is configured to form a flared waveguide having a conical section. In the example depicted in FIG. 2, the axisymmetric surface of each horn radiator 2 includes a first circular cylindrical surface **4*a* having a first diameter, a second circular cylindrical surface 4*c* having a second diameter greater than the first diameter, and a conical surface 4*b* that is connected to the first and second circular cylindrical surfaces. The conical surface 4*b* forms a boundary that defines the conical section of the flared waveguide. The circular opening at the end of the first circular cylindrical surface 4*a* abuts the PWB 18. The circular opening at the end of the second circular cylindrical surface 4*c* is the physical aperture (mouth) of the horn radiator 2**.

In accordance with the embodiment depicted in FIG. 2, the diplexer plate 14 has been machined to include an array of circular cylindrical cavities 23, which act as waveguides. Each circular cylindrical cavity 23 has a circular cross section in a plane perpendicular to the plane in which the cross-sectional view of FIG. 2 is taken. Each circular cylindrical cavity 23 is bounded in part by a lower surface that forms a respective circular waveguide backshort 24. In accordance with one proposed implementation, the circular waveguide backshorts 24 are respectively congruent and aligned with the circular openings at the ends of the first circular cylindrical surfaces 4*a* of the array of horn radiators 2. The circular waveguide backshorts 24 reflect impinging EM radiation back toward the PWB 18.

Figure 3:
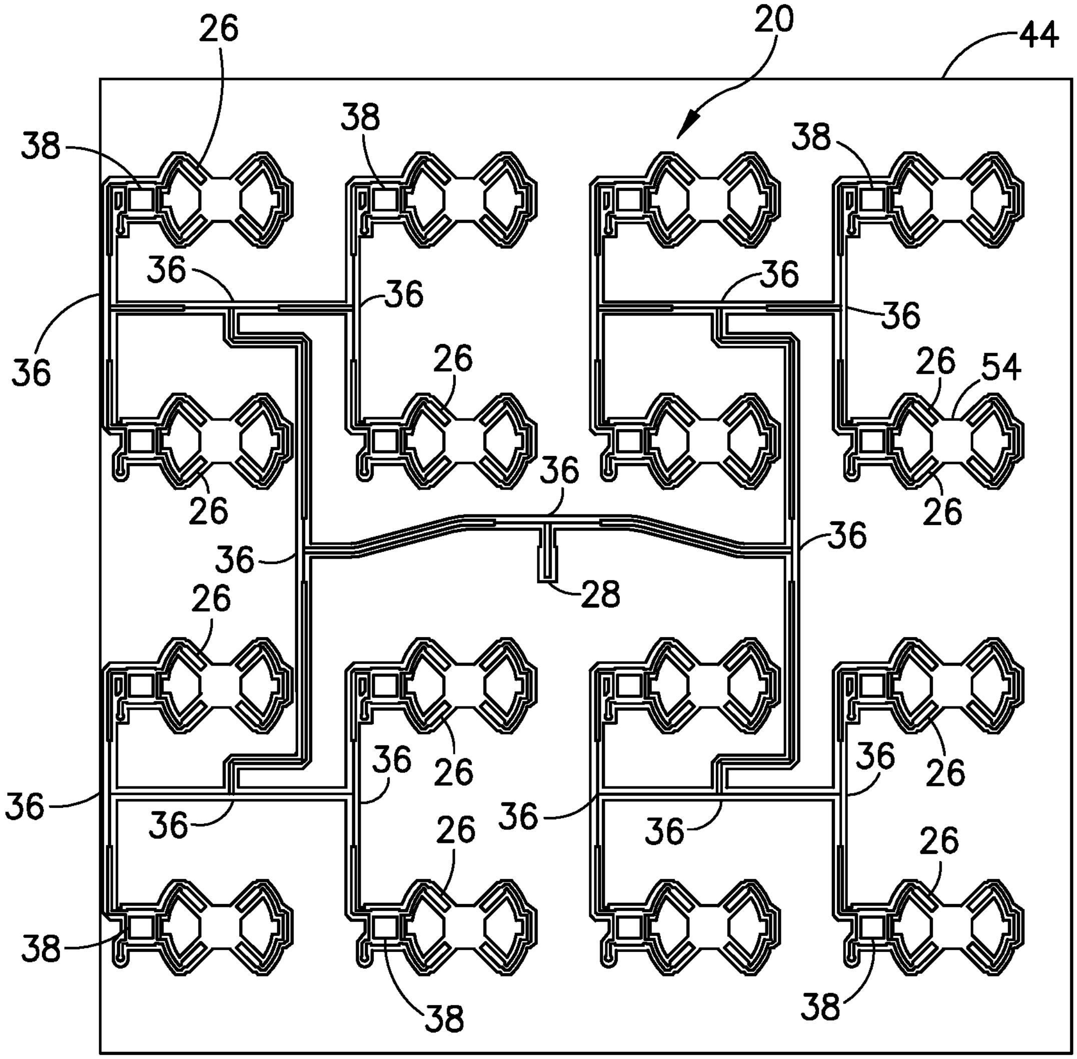
FIG. 3 is a diagram representing a top view of an RF stripline distribution network embedded in the PWB of the aperture antenna depicted in FIG. 2.

FIG. 3 is a diagram representing a top view of a stripline distribution network 20 that is printed on a substrate made of dielectric material (hereinafter "dielectric layer 44"), which dielectric layer is part of the laminated structure of the PWB 18 of aperture antenna 10 depicted in FIG. 2. In order to save weight, the stripline distribution network 20 is preferably placed in routed channels 54 formed in the dielectric layer 44.

The stripline distribution network 20 includes an array of dual-pole horn feed probes 26 (hereinafter "horn feed probes 26") which enable the horn waveguide-to-stripline transitions and a diplexer feed probe 28 which enables the diplexer waveguide-to-stripline transition. The aperture antenna 10 includes one horn feed probe 26 for each horn radiator 2. For example, in the aperture antenna 10 depicted in FIG. 1, the stripline distribution network 20 includes a 4×4 array horn feed probes 26. Each horn feed probe 26 is disposed between a respective circular cylindrical backshort cavity 23 of the diplexer plate 14 and a respective circular cylindrical section of the horn waveguide formed by the first circular cylindrical surface 4*a* of a respective horn radiator 2.

Figure 4:
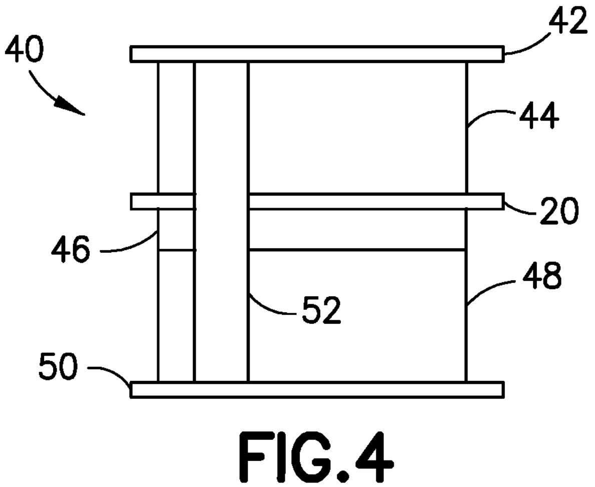
FIG. 4 is a diagram representing a cross-sectional view of a portion of a PWB in accordance with one proposed implementation.

FIG. 4 is a diagram representing a cross-sectional view of a portion of a PWB 18 having a laminated structure 40 in accordance with one proposed implementation. The laminated structure includes an upper ground plane 42, a first dielectric layer 44 on which the stripline distribution network 20 is printed, a layer of prepreg (preimpregnated) material 46, a second dielectric layer 48, and a lower ground plane 50. The layer of prepreg material 46 holds the dielectric layers 44 and 48 together. One suitable dielectric material is ceramic-filled polytetrafluoroethylene composite material. The upper and lower ground planes 42 and 50 are electrically connected by a multiplicity of metal-plated vias 52, only one of which is depicted in FIG. 4. Many metal-plated vias 52 may be arranged to follow a line on either side of the stripline (except in the areas of the transitions) to provide ground mode suppression.

Figure 5:
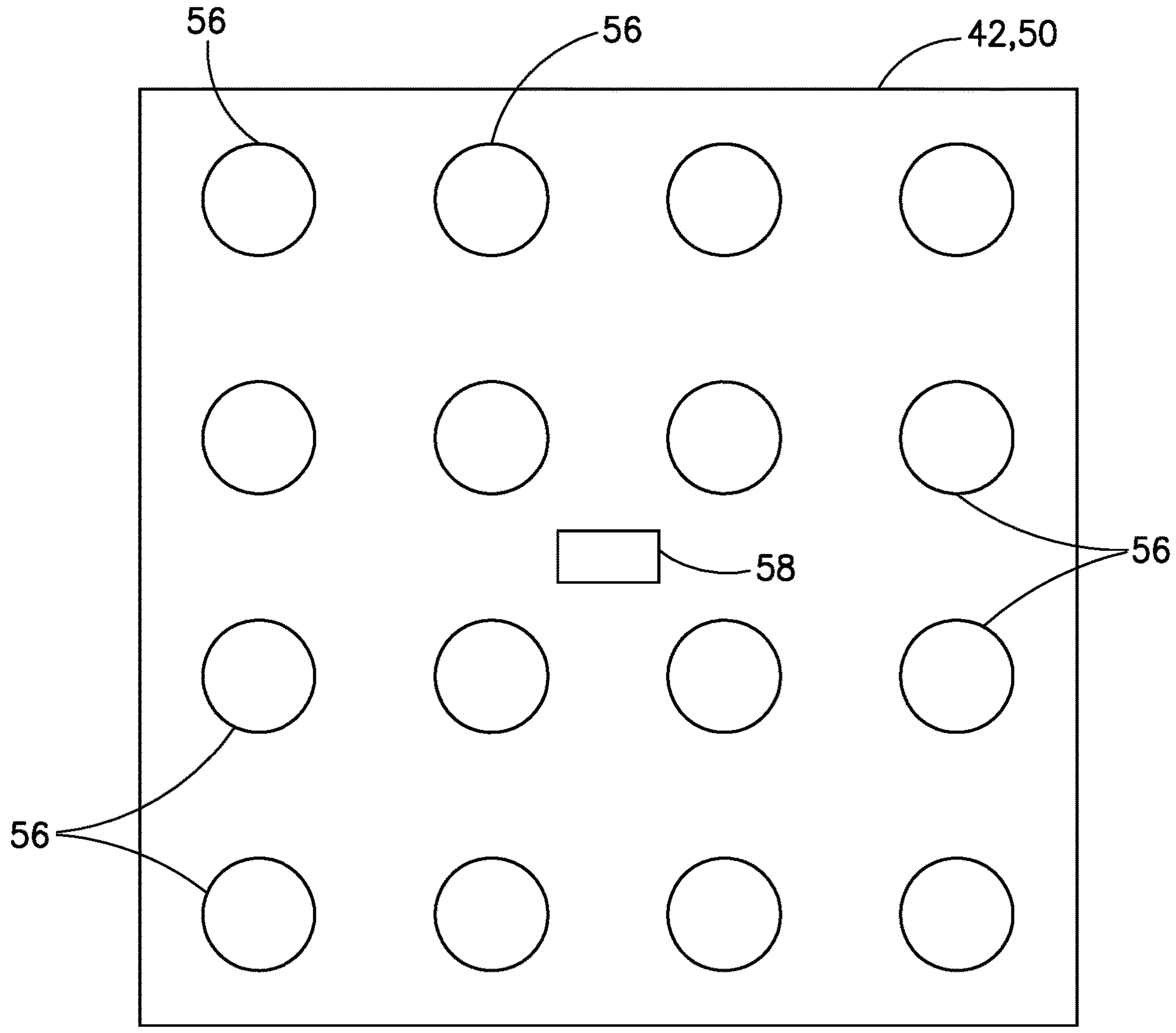
FIG. 5 is a diagram representing a top view of a ground plane of the PWB partly depicted in FIG. 4.

As seen in FIG. 5, the ground planes 42 and 50 of the PWB 18 have respective rectangular openings 58 which are aligned with the diplexer feed probe 28 and a respective 4×4 array of circular openings 56 which are aligned with the 4×4 array of horn feed probes 26. The EM radiation emitted from the feed probes propagates through the openings which are respectively aligned with the feed probes.

Referring again to FIG. 3, during transmission the array of horn feed probes 26 receive split power from the diplexer feed probe 28 by way of a plurality of half-power splitters 36. As seen in FIG. 3, the stripline distribution network 20 further includes an array of branchline couplers 38 which are respectively connected to the array of horn feed probes 26. The branchline couplers 38 are connected to the diplexer feed probe 28 via the half-power splitters 36. In the example depicted in FIG. 3, the power supplied to each horn feed probe 26 of the 4×4 array of horn feed probes 26 by the diplexer feed probe 28 is split four times (by four half-power splitters 36) and then circularly polarized by the branchline couplers 38. Each branchline coupler 38 is a quadrature coupler which splits the input into two signals that are 90 degrees apart in phase. The branchline couplers 38 are configured such that the horn feed probes 26 emit left-hand circularly polarized EM radiation during transmission.

The diplexer feed probe 28 is configured to convert EM radiation from a waveguide diplexer into alternating current that powers the horn feed probes 26 to emit EM radiation during transmission. Returning attention to FIG. 2, the diplexer plate 14 and the backside cover plate 16 have been machined to form a waveguide diplexer 6 having a rectangular cross section. The waveguide diplexer 6 includes: a T-junction 8*a* having a first port 30; a first diplexer arm 8*b* connected to the T-junction 8*a*; a first E-plane bend 8*c* connected to the first diplexer arm 8*b* and having a second port 32; a second diplexer arm 8*d* connected to the T-junction 8*a*; and a second E-plane bend 8*e* connected to the second diplexer arm 8*d* and having a third port 34. Each segment of the waveguide diplexer 6 has a rectangular cross section. More specifically, three walls of the rectangular waveguide diplexer are machined into the diplexer plate 14 and the fourth wall of the waveguide diplexer is formed by the upper surface of the backside cover plate 16.

In addition, the first port 30 is machined into the diplexer plate 14, whereas the second and third ports 32 and 34 are machined into the backside cover plate 16. Each of the first through third ports has a rectangular cross section. The second port 32 is coupled to a transmitter (not shown in the drawings). The third port 34 is coupled to a receiver (not shown in the drawings). The first port 30 forms a rectangular diplexer feed input/output. During transmission, EM radiation propagates from the second port 32 of the first E-plane bend 8*c*, through the first E-plane bend 8*c*, through the first diplexer arm 8*b*, and exits the first port 30 of T-junction 8*a*. During reception, EM radiation propagates from the first port 30 of T-junction 8*a*, through the second diplexer arm 8*d*, through the second E-plane bend 8*e*, through the first, and exits the third port 34 of the second E-plane bend 8*e*. The third port has a rectangular cross section in a plane perpendicular to the plane in which the cross-sectional view of FIG. 2 is taken.

The method of assembling the pieces that form the waveguide diplexer may vary in dependence on the type of filters used for each of the diplexer arms. Machining would limit the corner bend radii within steps and pockets. Wire electrical discharge machining (EDM) or sinker EDM could also be employed. Additive manufacturing would be another potentially less costly technique for fabricating the waveguide diplexer.

In addition to the horn radiators 2, the radiator plate 12 depicted in FIG. 2 may be machined to include a box-shaped (parallelepiped) cavity 21 having a rectangular cross section in a plane perpendicular to the plane in which the cross-sectional view of FIG. 2 is taken. The cavity 21 is bounded in part by an upper surface that forms a rectangular waveguide backshort 22. The rectangular waveguide backshort 22 reflects EM radiation emitted by the diplexer feed probe 28. In accordance with one proposed implementation, the rectangular waveguide backshort 22 is congruent and aligned with the rectangular first port 30 of the waveguide diplexer 6. The rectangular waveguide backshort 22 reflects impinging EM radiation back toward the PWB 18. The diplexer feed probe 28 is disposed between the box-shaped cavity 21 of the radiator plate 12 and the first port 30 of the waveguide diplexer 6.

During transmission, EM radiation from waveguide diplexer 6 impinges on the diplexer feed probe 28. The resultant electromagnetic coupling produces radio frequency AC power which is supplied to the horn feed probes 26 by means of the stripline distribution network 20, causing the horn feed probes 26 to emit EM radiation in opposite directions. The EM radiation which is emitted toward the mouth of each horn radiator 2 propagates through the successive spaces bounded by first circular cylindrical surface 4*a*, by the conical surface 4*b*, and by second circular cylindrical surface 4*c* and then exits the mouth of the horn radiator 2. The EM radiation which is emitted in the opposite direction by each horn feed probe 26 impinges on and is reflected by a respective circular waveguide backshort 24. The backshort-reflected EM radiation propagates toward and also exits the mouth of the horn radiator 2.

During reception, EM radiation entering the horn radiators 2 impinges on the horn feed probes 26. The resultant electromagnetic coupling produces alternating current in the stripline distribution network 20, causing the diplexer feed probe 28 to emit EM radiation in opposite directions. The EM radiation which is emitted toward the first port 30 propagates through the first diplexer arm 8*b* and first E-plane bend 8*c* and exits the second port 32. The EM radiation which is emitted in the opposite direction by diplexer feed probe 28 impinges on and is reflected by the rectangular waveguide backshort 22. The backshort-reflected EM radiation propagates toward and also enters the first port 30 of T-junction 8*a*.

A diplexer is a passive device that implements frequency-domain multiplexing. A diplexer typically includes a low-pass filter and a high-pass filter having non-overlapping frequency bands in order to isolate transmitted signals and received signals from each other.

Figure 6:
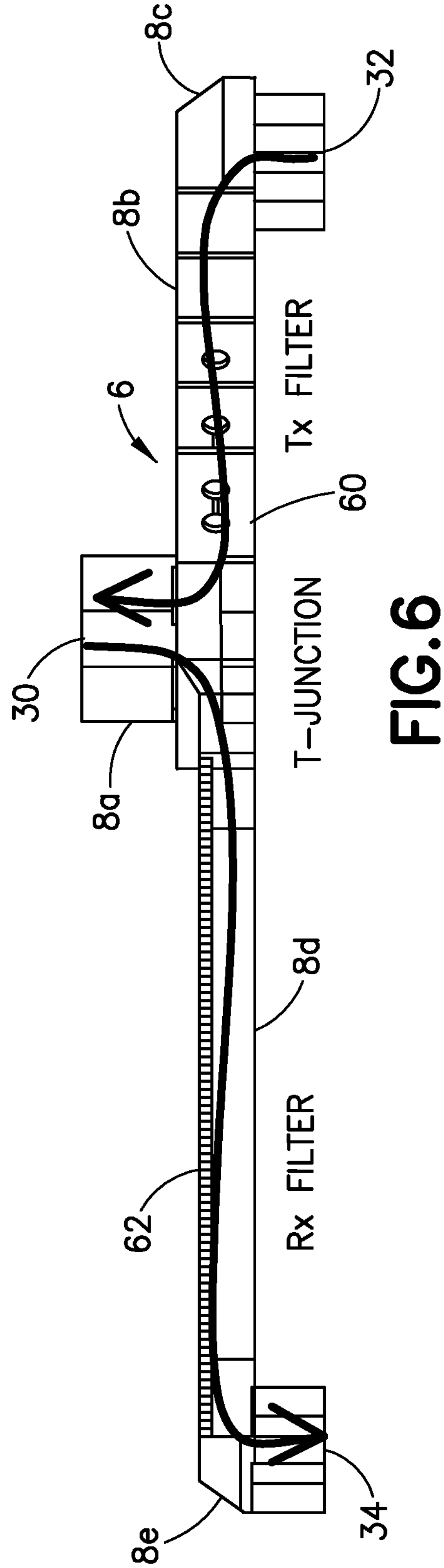
FIG. 6 is a diagram representing a waveguide diplexer having a T-junction, transmit and receive filters, and E-plane bends in accordance with one embodiment.

FIG. 6 is a diagram representing a waveguide diplexer 6 that includes a T-junction 8*a*, first and second diplexer arms 8*b* and 8*d*, and first and second E-plane bends 8*c* and 8*e*. The T-junction 8*a* has a first port 30. The first diplexer arm 8*b* is connected to the T-junction 8*a* and comprises a transmit filter 60. The first E-plane bend 8*c* is connected to the first diplexer arm 8*b* and has a second port 32 which is coupled to a transmitter (not shown). The second diplexer arm 8*d* is connected to the T-junction 8*a* and comprises a receive filter 62. The second E-plane bend 8*e* is connected to the second diplexer arm 8*d* and has a third port 34 which is coupled to a receiver (not shown).

The transmit filter 60 has a first passband and the receive filter 62 has a second passband which does not overlap with the first passband. Thus, the transmit filter 60 isolates the transmitter second port 32 from received signals, while the receive filter 62 isolates the third port 34 from the transmitted signals.

Figure 7:
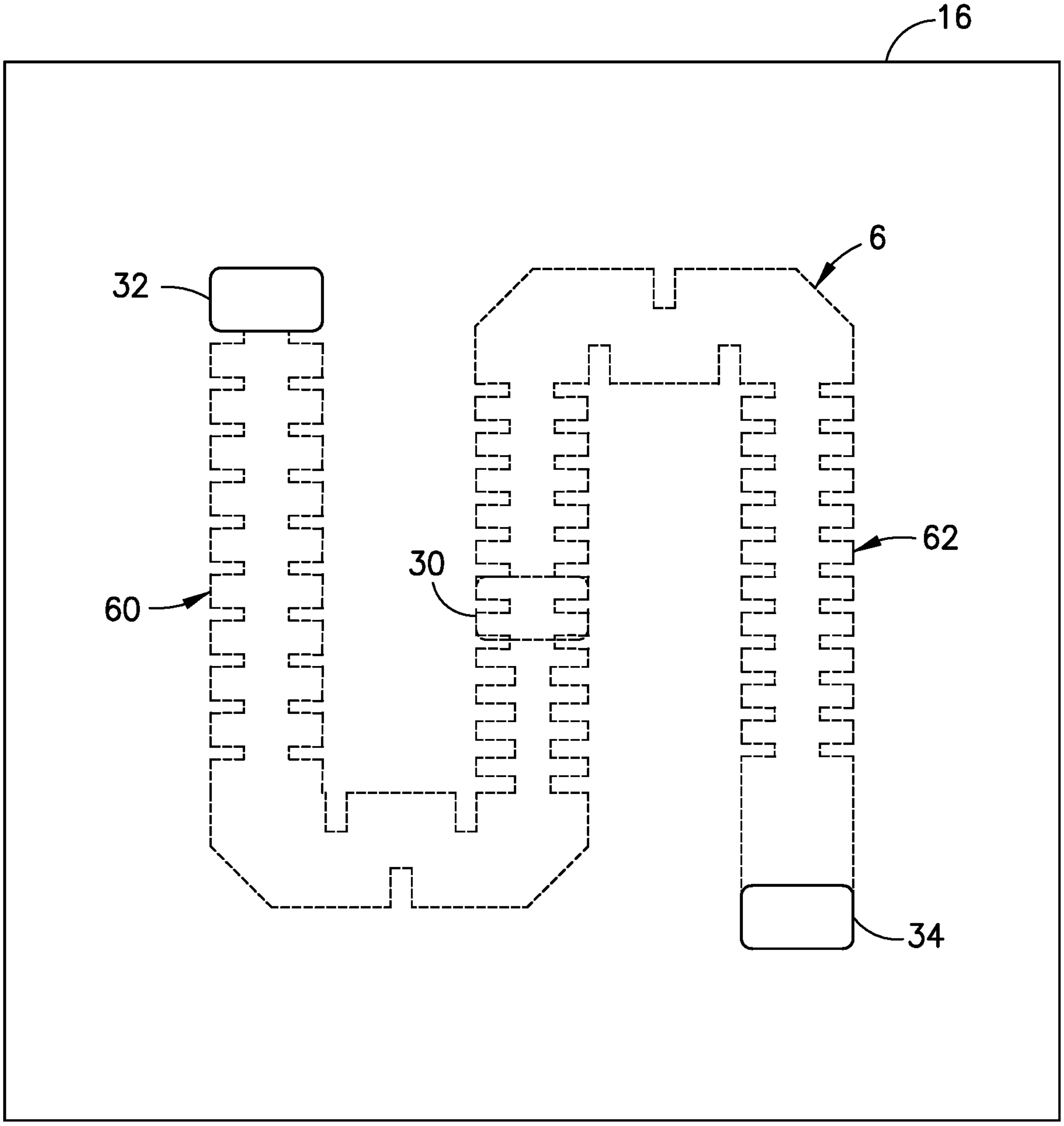
FIG. 7 is a diagram representing a bottom view of the backside cover plate of the aperture antenna depicted in FIG. 2 in accordance with an alternative proposed implementation. The dashed lines represent a hidden waveguide diplexer Reference will hereinafter be made to the drawings in which similar elements in different drawings bear the same reference numerals.

In accordance with the embodiment depicted in FIG. 6, the diplexer arms are collinear. In accordance with an alternative embodiment, the waveguide diplexer 6 may have a meandering configuration. FIG. 7 is a diagram representing a bottom view of the backside cover plate 16 of the aperture antenna 10 depicted in FIG. 2 in accordance with an alternative proposed implementation. The dashed lines represent a hidden waveguide diplexer 6 having a meandering configuration. In this bottom view, the second port 32 and third port 34 are visible and therefore represented by solid rectangles with rounded corners. In contrast, the first port 30 is hidden on the other side of the diplexer plate, which is behind the backside cover plate 16, so the first port 30 is represented by a dashed rectangle with rounded corners.

The waveguide diplexer 6 depicted in FIG. 7 includes a transmit filter 60 and a receive filter 62. The differences between the transmit and receive filters is shown merely to highlight that the transmit and receive filters are at different operating frequencies which will translate to different feature dimensions to create the filter. The meander is intended to add length, which allows for more filter sections that increase the filter selectivity and isolation between the transmit and receive frequency bands. An integrated meandering design may be employed, instead of straight sections, to save depth and reduce weight but involves more time and effort to fabricate.

The presence of the second and third ports 32 and 34 makes the backside cover plate 16 an ideal place to include a receive low-noise amplifier and a transmit high-power amplifier with the necessary up/down conversion, modulation/demodulation and biasing circuits (which would complete an integrated transceiver). More specifically, a high-gain, low-noise amplifier may be attached to the backside cover plate 16 and coupled to the second port 32; a high-power amplifier may be attached to the backside cover plate 16 and coupled to the third port 34.

While aperture antennas having an integrated waveguide diplexer have been described with reference to various embodiments, it will be understood by those skilled in the art that various changes may be made and equivalents may be substituted for elements thereof without departing from the teachings herein. In addition, many modifications may be made to adapt the concepts and reductions to practice disclosed herein to a particular situation. Accordingly, it is intended that the subject matter covered by the claims not be limited to the disclosed embodiments.

In the method claims appended hereto, any alphabetic ordering of steps is for the sole purpose of enabling subsequent short-hand references to antecedent steps and not for the purpose of limiting the scope of the claim to require that the method steps be performed in alphabetic order.

The invention claimed is:

1. An aperture antenna comprising a diplexer plate, a printed wiring board attached to the diplexer plate and comprising a stripline distribution network, a radiator plate attached to the printed wiring board, and a backside cover plate attached to the diplexer plate, wherein:

the stripline distribution network comprises a diplexer feed probe and an array of horn feed probes;

the radiator plate comprises an array of horn radiators which are respectively configured to couple to the array of horn feed probes during antenna operation; and the diplexer plate and backside cover plate are configured to form a waveguide diplexer that is coupled to the diplexer feed probe during antenna operation, wherein the waveguide diplexer comprises:

a T-junction having a first port;

a first diplexer arm connected to the T-junction, the first diplexer arm comprising a transmit filter;

a first bend connected to the first diplexer arm, the first bend having a second port;

a second diplexer arm connected to the T-junction, the second diplexer arm comprising a receive filter; and a second bend connected to the second diplexer arm, the second bend having a third port, wherein the diplexer feed probe is configured to couple to the first port of the waveguide diplexer during antenna operation, and wherein the first port is rectangular, and the radiator plate further comprises a rectangular waveguide backshort which is congruent and aligned with the first port of the waveguide diplexer.

2. The aperture antenna as recited in claim 1, wherein the transmit filter has a first passband and the receive filter has a second passband which does not overlap with the first passband.

3. The aperture antenna as recited in claim 1, wherein the printed wiring board further comprises a pair of ground planes made of metal, each ground plane having an array of openings respectively aligned with the array of horn radiators and having an opening aligned with the first port.

4. The aperture antenna as recited in claim 1, wherein the diplexer feed probe is disposed between the first port and the rectangular waveguide backshort.

5. The aperture antenna as recited in claim 1, wherein the second and third ports of the waveguide diplexer are formed in the backside cover plate.

6. The aperture antenna as recited in claim 1, wherein the diplexer plate comprises an array of circular waveguide backshorts which are respectively congruent and aligned with the array of horn radiators.

7. The aperture antenna as recited in claim 1, wherein the stripline distribution network further comprises:

a plurality of half-power splitters connected to the diplexer feed probe; and an array of branchline couplers respectively connected to the array of horn feed probes, wherein the branchline couplers are connected to the diplexer feed probe via the half-power splitters.

8. An aperture antenna comprising a diplexer plate, a printed wiring board attached to the diplexer plate and comprising a stripline distribution network, and a radiator plate attached to the printed wiring board, wherein:

the radiator plate comprises an array of horn radiators disposed adjacent to one side of the printed wiring board, each horn radiator having a respective circular opening at one end;

the diplexer plate comprises an array of circular waveguide backshorts disposed on another side of the printed wiring board;

the circular openings of the radiator plate and the circular waveguide backshorts of the diplexer plate are congruent and respectively aligned;

the radiator plate further comprises a rectangular waveguide backshort disposed on the one side of the printed wiring board;

the diplexer plate further comprises a rectangular port disposed adjacent to the other side of the printed wiring board; and the rectangular waveguide backshort of the radiator plate and the rectangular port of the diplexer plate are congruent and aligned.

9. The aperture antenna as recited in claim 8, wherein the stripline distribution network comprises an array of horn feed probes respectively disposed between the array of circular openings of the radiator plate and the array of circular waveguide backshorts of the diplexer plate.

10. The aperture antenna as recited in claim 8, wherein the stripline distribution network further comprises a diplexer feed probe disposed between the rectangular waveguide backshort of the radiator plate and the rectangular port of the diplexer plate.

11. The aperture antenna as recited in claim 8, further comprising a backside cover plate attached to the diplexer plate, wherein the diplexer plate and backside cover plate are configured to form a waveguide diplexer.

12. The aperture antenna as recited in claim 11, wherein the waveguide diplexer comprises:

a T-junction having a first port;

a first diplexer arm connected to the T-junction, the first diplexer arm comprising a transmit filter;

a first bend connected to the first diplexer arm and having a second port;

a second diplexer arm connected to the T-junction, the second diplexer arm comprising a receive filter; and a second bend connected to the second diplexer arm and having a third port.

13. An aperture antenna comprising:

a printed wiring board comprising a stripline distribution network, wherein the stripline distribution network comprises a diplexer feed probe and an array of horn feed probes;

a radiator plate disposed adjacent to one side of the printed wiring board, wherein the radiator plate comprises an array of horn radiators, wherein each horn radiator has a respective circular opening at one end;

a diplexer plate disposed adjacent to another side of the printed wiring board, wherein the diplexer plate comprises an array of circular waveguide backshorts which are respectively aligned with the circular openings of the radiator plate, and wherein the array of horn feed probes are respectively disposed between the array of circular waveguide backshorts of the diplexer plate and the circular openings of the radiator plate; and a backside cover plate disposed adjacent to the diplexer plate, wherein the diplexer plate and backside cover plate are configured to form a waveguide diplexer having a first port formed in the diplexer plate and having second and third ports formed in the backside cover plate, wherein:

the radiator plate further comprises a rectangular waveguide backshort disposed on the one side of the printed wiring board, the first port formed in the diplexer plate is rectangular and disposed adjacent to the other side of the printed wiring board, and the diplexer feed probe is disposed between the first port of the diplexer plate and the rectangular waveguide backshort of the radiator plate.

14. The aperture antenna as recited in claim 13, wherein the stripline distribution network further comprises:

a plurality of half-power splitters connected to the diplexer feed probe; and an array of branchline couplers respectively connected to the array of horn feed probes, wherein the branchline couplers are connected to the diplexer feed probe via the half-power splitters.

15. The aperture antenna as recited in claim 13, wherein the waveguide diplexer comprises:

a T-junction having a first port;

a first diplexer arm connected to the T-junction, the first diplexer arm comprising a transmit filter;

a first bend connected to the first diplexer arm and having a second port;

a second diplexer arm connected to the T-junction, the second diplexer arm comprising a receive filter; and a second bend connected to the second diplexer arm and having a third port.

16. An aperture antenna comprising:

a printed wiring board comprising a stripline distribution network, wherein the stripline distribution network comprises a diplexer feed probe and an array of horn feed probes;

a radiator plate disposed adjacent to one side of the printed wiring board, wherein the radiator plate comprises an array of horn radiators, wherein each horn radiator has a respective circular opening at one end;

a diplexer plate disposed adjacent to another side of the printed wiring board, wherein the diplexer plate comprises an array of circular waveguide backshorts which are respectively aligned with the circular openings of the radiator plate, and wherein the array of horn feed probes are respectively disposed between the array of circular waveguide backshorts of the diplexer plate and the circular openings of the radiator plate; and a backside cover plate disposed adjacent to the diplexer plate, wherein the diplexer plate and backside cover plate are configured to form a waveguide diplexer having a first port formed in the diplexer plate and having second and third ports formed in the backside cover plate, wherein:

the radiator plate further comprises a waveguide backshort disposed on the one side of the printed wiring board, the first port formed in the diplexer plate is disposed adjacent to the other side of the printed wiring board, and the diplexer feed probe is disposed between the first port of the diplexer plate and the waveguide backshort of the radiator plate.

17. The aperture antenna as recited in claim 16, wherein the stripline distribution network further comprises:

a plurality of half-power splitters connected to the diplexer feed probe; and an array of branchline couplers respectively connected to the array of horn feed probes, wherein the branchline couplers are connected to the diplexer feed probe via the half-power splitters.

18. The aperture antenna as recited in claim 16, wherein the waveguide diplexer comprises:

a T-junction having a first port;

a first diplexer arm connected to the T-junction, the first diplexer arm comprising a transmit filter;

a first bend connected to the first diplexer arm and having a second port;

a second diplexer arm connected to the T-junction, the second diplexer arm comprising a receive filter; and a second bend connected to the second diplexer arm and having a third port.

19. The aperture antenna as recited in claim 18, wherein the transmit filter has a first passband and the receive filter has a second passband which does not overlap with the first passband.

20. The aperture antenna as recited in claim 18, wherein the printed wiring board further comprises a pair of ground planes made of metal, each ground plane having an array of openings respectively aligned with the array of horn radiators and having an opening aligned with the first port.

* * * * *